(12) United States Patent
Manssour et al.

(10) Patent No.: US 8,665,866 B2
(45) Date of Patent: Mar. 4, 2014

(54) RELATIVE TIME DIVISION FOR NETWORK CODING

(75) Inventors: Jawad Manssour, Stockholm (SE); Afif Osseiran, Kista (SE)

(73) Assignee: Unwired Planet, LLC, Reno, NV (US)

( * ) Notice: Subject to any disclaimer, the term of this patent is extended or adjusted under 35 U.S.C. 154(b) by 289 days.

(21) Appl. No.: 13/058,388

(22) PCT Filed: Aug. 15, 2008

(86) PCT No.: PCT/SE2008/050925
§ 371 (c)(1),
(2), (4) Date: Feb. 10, 2011

(87) PCT Pub. No.: WO2010/019083
PCT Pub. Date: Feb. 18, 2010

(65) Prior Publication Data
US 2011/0142013 A1    Jun. 16, 2011

(51) Int. Cl.
*H04L 12/00* (2006.01)
(52) U.S. Cl.
USPC .......................................... 370/360; 370/280
(58) Field of Classification Search
USPC .......................................... 370/336, 345–350
See application file for complete search history.

(56) References Cited

U.S. PATENT DOCUMENTS

| | | | |
|---|---|---|---|
| 4,028,497 A * | 6/1977 | Saburi | 370/321 |
| 5,491,741 A * | 2/1996 | Farwell et al. | 370/347 |
| 5,530,700 A * | 6/1996 | Tran et al. | 370/461 |
| 5,663,957 A * | 9/1997 | Dent | 370/347 |
| 5,999,538 A * | 12/1999 | Haddock et al. | 370/446 |
| 6,396,832 B1 * | 5/2002 | Kranzler | 370/360 |
| 6,532,224 B1 * | 3/2003 | Dailey | 370/337 |
| 7,277,411 B2 * | 10/2007 | Shneyour et al. | 370/337 |
| 7,313,110 B2 * | 12/2007 | Guey et al. | 370/329 |
| 7,719,981 B2 * | 5/2010 | Ghanma et al. | 370/235 |
| 7,751,421 B2 * | 7/2010 | Chi et al. | 370/429 |
| 7,839,882 B2 * | 11/2010 | Soliman | 370/437 |

(Continued)

FOREIGN PATENT DOCUMENTS

| | | |
|---|---|---|
| WO | 2007/075129 A1 | 7/2007 |
| WO | WO 2009/126079 | 10/2009 |

OTHER PUBLICATIONS

Horng, M.-F. et al. "Dynamic Slot Allocation to Control Delay in TDMA Wireless Base Station." Proceedings of the 8th IEEE International Symposium on Computers and Communication, 2003 (ISCC 2003), Jun. 30-Jul. 3, 2003, pp. 1126-1131.

(Continued)

*Primary Examiner* — Bunjob Jaroenchonwanit
(74) *Attorney, Agent, or Firm* — Nixon & Vanderhye P.C.

(57) ABSTRACT

A base station serves multiple user terminals via a relay node in a cell of a wireless network. The base station includes a time division scheme selection unit that selects a time division scheme from multiple time division schemes that optimizes a parameter associated with network coding of data transmitted between the multiple user terminals and the base station via the relay node. The base station further includes a transmission allocation unit that allocates uplink and/or downlink transmission intervals and interval lengths, based on the selected time division scheme, to each of the multiple user terminals and to the relay node. The base station also includes a notification message unit that notifies the multiple user terminals and the relay node of their respective transmission interval and interval length allocation.

16 Claims, 11 Drawing Sheets

(56) References Cited

U.S. PATENT DOCUMENTS

| | | | |
|---|---|---|---|
| 8,036,164 B1* | 10/2011 | Winters et al. | 370/329 |
| 8,064,392 B2* | 11/2011 | Chang et al. | 370/329 |
| 2001/0053142 A1* | 12/2001 | Abe et al. | 370/337 |
| 2003/0021245 A1* | 1/2003 | Haumonte et al. | 370/330 |
| 2004/0013101 A1* | 1/2004 | Akin et al. | 370/342 |
| 2004/0014477 A1* | 1/2004 | Ishiguro et al. | 455/450 |
| 2004/0028018 A1* | 2/2004 | Cain | 370/338 |
| 2004/0037251 A1* | 2/2004 | Shneyour et al. | 370/336 |
| 2004/0071163 A1* | 4/2004 | Hogberg et al. | 370/468 |
| 2004/0213197 A1* | 10/2004 | Zimmerman et al. | 370/346 |
| 2004/0214577 A1* | 10/2004 | Borst et al. | 455/446 |
| 2004/0264492 A1* | 12/2004 | Blahut et al. | 370/442 |
| 2005/0094675 A1* | 5/2005 | Bhushan et al. | 370/527 |
| 2005/0124352 A1* | 6/2005 | Fernandez-Corbaton et al. | 455/452.2 |
| 2005/0169389 A1* | 8/2005 | Fischer | 375/259 |
| 2005/0265223 A1* | 12/2005 | Song | 370/208 |
| 2007/0201400 A1 | 8/2007 | Kang et al. | |
| 2008/0008206 A1* | 1/2008 | Cho et al. | 370/430 |
| 2008/0031217 A1* | 2/2008 | Bonald et al. | 370/347 |
| 2008/0057969 A1* | 3/2008 | Agami et al. | 455/450 |
| 2008/0117881 A1* | 5/2008 | Golitschek Edler Von Elbwart et al. | 370/335 |
| 2008/0153495 A1* | 6/2008 | Ogami et al. | 455/436 |
| 2008/0188177 A1* | 8/2008 | Tan et al. | 455/11.1 |
| 2008/0198815 A1* | 8/2008 | Liu | 370/336 |
| 2009/0268790 A1* | 10/2009 | Josiam et al. | 375/211 |
| 2009/0285148 A1* | 11/2009 | Luo et al. | 370/315 |
| 2009/0285196 A1* | 11/2009 | Lee et al. | 370/345 |
| 2010/0034185 A1* | 2/2010 | De Bruin et al. | 370/342 |
| 2010/0146274 A1* | 6/2010 | Naslund et al. | 713/168 |
| 2010/0290406 A1* | 11/2010 | Miki et al. | 370/329 |
| 2011/0026429 A1 | 2/2011 | Ben Slimane et al. | |
| 2011/0045838 A1* | 2/2011 | Furuskar et al. | 455/452.2 |
| 2011/0134828 A1 | 6/2011 | Osseiran et al. | |
| 2011/0142013 A1 | 6/2011 | Manssour et al. | |
| 2011/0158646 A1* | 6/2011 | Yuang et al. | 398/48 |
| 2012/0263100 A1* | 10/2012 | Yuan et al. | 370/315 |
| 2013/0012119 A1* | 1/2013 | Ma et al. | 455/9 |

OTHER PUBLICATIONS

Pu, W. et al. "Continuous Network Coding in Wireless Relay Networks." The 27th IEEE Conference on Computer Communications (INFOCOM 2008), Apr. 13-18, 2008, pp. 1526-1534.

Woldegebreal, D. H. et al. "Multiple Access Relay Channel with Network Coding and Non-Ideal Source-Relay Channels." 4th International Symposium on Wireless Communication Systems, 2007 (ISWCS 2007), Oct. 17-19, 2007, pp. 732-736.

R. Ahlswede, et al., Network Information Flow, IEEE Trans. Information Theory, IT-46(4):1204-1216, Jul. 2000.

Y. Chen et al., Wireless Diversity Through Network Coding, IEEE WCNC Proceedings, 2006, pp. 1-6.

T. Ho et al., The Benefits of Coding Over Routing in a Randomized Setting, in IEEE Proc. Int'l Symp. Information Theory, Yokohama, Japan, Jun. 2003, pp. 1-6.

S.-Y.R. Li et al., Linear Network Coding, IEEE Trans. Information Theory, IT-49(2):371-381, Feb. 2003.

P. Popovski et al., The Anti-Packets Can Increase the Achievable Throughput of a Wireless Multi-Hop Network, In Proc. IEEE International Conference on Communication (ICC2006), Istanbul, Turkey, Jun. 2006, 6 pages.

Y. Wu et al., Information Exchange in Wireless Networks with Network Coding and Physical-Layer Broadcast, In 39th Annual Conference on Information Sciences and Systems (CISS), Baltimore, MD, Mar. 2005, 6 pages.

S. Zhang et al., Hot Topic: Physical-Layer Network Coding, In MobiCom '06: Proceedings of the 12th Annual International Conference on Mobile Computing and Networking, pp. 358-365, 2006.

* cited by examiner

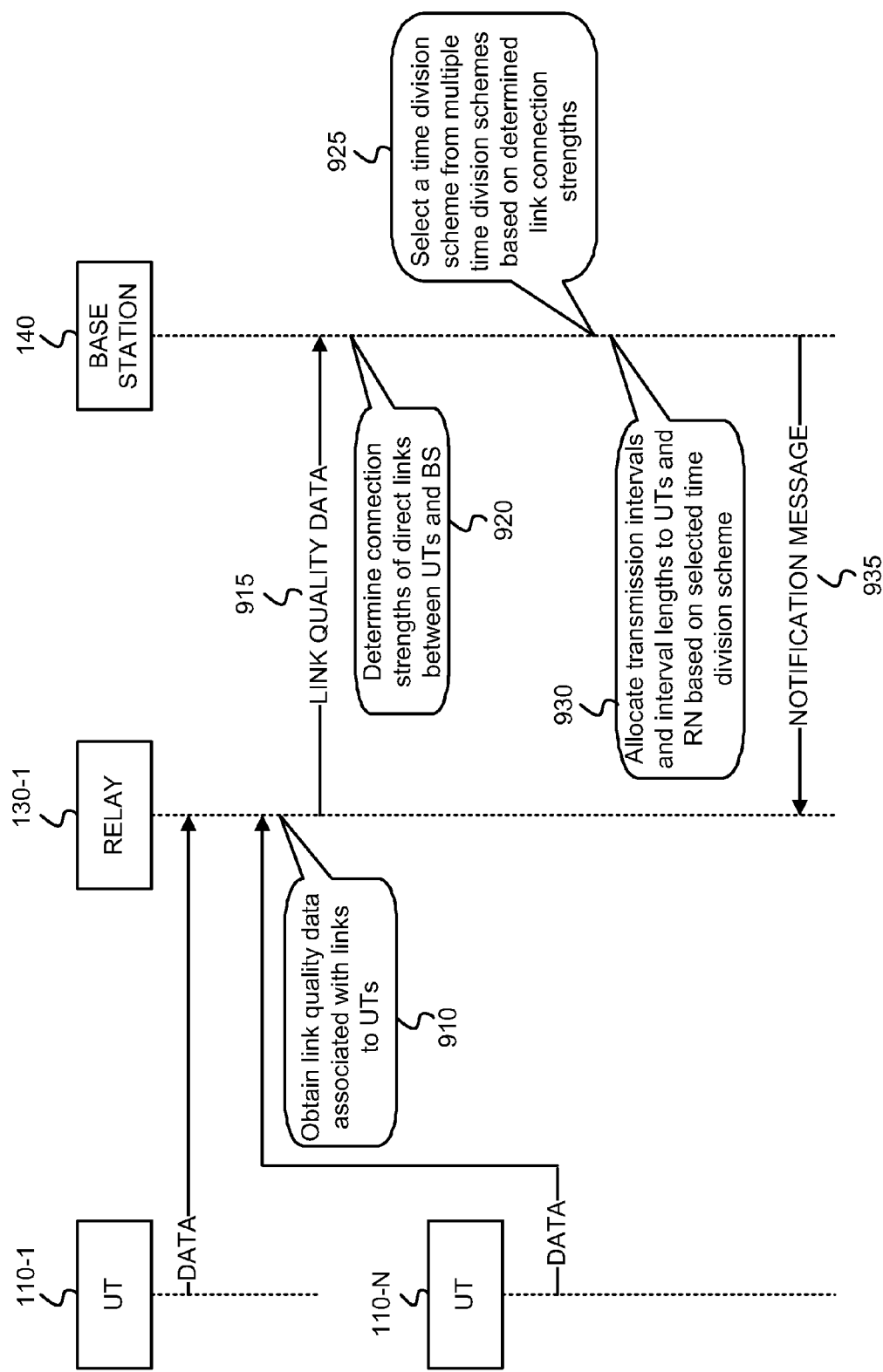

RELATIVE TIME DIVISION FOR NETWORK CODING

TECHNICAL FIELD

Implementations described herein relate generally to relaying in wireless communication systems and, more particularly, to the relative time division of transmission phases during network coding in wireless communication systems.

BACKGROUND

A striving force in the development of wireless/cellular communication networks and systems has been to provide increased network coverage and/or to support higher data rates. At the same time, the cost aspect of building and maintaining the system is of great importance and is expected to become even more so in the future. As data rates and/or communication distances are increased, the problem of increased battery consumption is another area of concern. Until recently, the main topology of wireless communication systems has been fairly unchanged, including the three existing generations of cellular networks. The topology of existing wireless communication systems is characterized by a cellular architecture that includes fixed radio base stations and mobile stations as the only transmitting and receiving entities in the networks typically involved in a communication session.

A technique for introducing macro-diversity in a received signal involves the use of relaying systems where information sent to an intended destination may be conveyed through various routes and combined at the destination. Each route may consist of one or more hops utilizing the relay nodes. In addition, the destination may receive the direct signal from the source. Cooperative relaying systems can be divided into numerous categories based on desired parameters. For instance, the way the signal is forwarded and encoded at the relay station can be classified into two categories: amplify-and-forward and decode-and-forward. In the amplify-and-forward case, the relays simply amplify and forward the received signal. In the decode-and-forward case, the relays demodulate and decode the signal prior to re-encoding and re-transmission.

Present day communication networks, described above, share the same fundamental principle of operation: the information or packet sent from a source to a destination is transported independently from other information sent from another source to the same destination. Routers, repeaters and relays simply forward the data to the destination. In contrast to those communication networks, network coding (NC) is a new area of networking, in which data is manipulated inside the network (e.g., at an intermediate node, N) to improve throughput, delay and robustness. In particular, NC allows the intermediate nodes to recombine several input packets into one or several output packets. At the intermediate node (referred to as the network coding node) some type of linear coding can be performed on the packets present at the network coding node, and the resulting encoded packet can be broadcast for different recipients simultaneously instead of transmitting each packet separately.

In wireless communications, network coding can be divided into two schemes: analog network coding and digital network coding. In analog network coding, coding may be performed at the signal level. This may consist of letting the analog signals add up in the air through simultaneous transmissions (i.e., by letting two signals interfere with each other intentionally). The coding (i.e., signal addition) may then occur at the intermediate relay node and both decode-and-forward and amplify-and-forward techniques may be employed in analog network coding. In digital network coding, coding may be performed at the packet level, with encoding being performed on the bits of the packets. The encoding may include XOR operations, or other types of bit operations, being performed on the bits of the packets. Digital network coding may be performed only with decode-and-forward relays, since the network coding node needs to possess decoding capabilities. When network coding is applied to a wireless relay network, a relay node may play the role of a network coding node.

SUMMARY

Exemplary embodiments described herein provide techniques for dividing and allocating the transmission resources (e.g., uplink or downlink) in the case where at least two user terminals transmit their data to a certain destination through a relaying node. Transmission intervals and interval lengths (e.g., in a cell of a wireless network) may be allocated to user terminals, and to a relay node involved in the network coding of data transmissions to a base station, based on the selection of a time division scheme from multiple time division schemes. Various time division schemes may be used herein for dividing the transmission intervals and interval lengths, and for allocating the time divided intervals to the user terminals and the relay node. Such time division schemes may include, but are not limited to, a time division scheme that attempts to achieve "fairness-per-node," a time division scheme that attempts to achieve "fairness-per-user terminal," and a time division scheme that attempts to achieve equal delay per user terminal. Any of these time division schemes or other time division schemes, either by themselves or in combination, may be selected to allocate transmission intervals and interval lengths to user terminals transmitting data to the relay node for network coding. Other time division schemes that may be selected include schemes based on channel quality measures of different links in the system. For example, the other time division schemes may be based on channel quality measures associated with the links between the user terminals and the relay node, between the relay node and the base station and/or between the user terminals and the base station.

In some implementations, a cost function-based algorithm may be used to optimize a certain parameter(s) associated with the network coding process through the selection of a time division scheme from the multiple different time division schemes. Implementations described herein, thus, provide network coding aware time division schemes that can control the fairness of the system while being able to maximize a performance measure of interest through design of a cost function. Implementations described herein further increase system spectral efficiency and reduce system outages, and can be combined with user terminal grouping algorithms and relay node selection algorithms to optimize scheduling (e.g., throughput, fairness) for a network coding system.

According to one aspect, a method may include determining qualities of links between user terminals and a base station in a wireless network and selecting a time division scheme from multiple time division schemes based on the determined qualities of the links. The method may further include allocating transmission intervals and interval lengths, based on the selected time division scheme, to each of the user terminals and to a relay node that relays data transmissions from the user terminals to the base station. The method may also include notifying the user terminals and the relay node of their respective allocated transmission intervals and interval lengths.

According to a further aspect, a base station that serves multiple user terminals via a relay node in a cell of a wireless network may include a time division scheme selection unit configured to select a time division scheme from multiple time division schemes that optimizes a parameter associated with network coding of data transmitted between the multiple user terminals and the base station via the relay node. The base station may further include a transmission allocation unit configured to allocate uplink and/or downlink transmission intervals and interval lengths, based on the selected time division scheme, to each of the multiple user terminals and to the relay node. The base station may also include a notification message unit configured to notify the multiple user terminals and the relay node of their respective transmission interval and interval length allocation.

BRIEF DESCRIPTION OF THE DRAWINGS

The accompanying drawings, which are incorporated in and constitute a part of this specification, illustrate one or more embodiments of the invention and, together with the description, explain the invention. In the drawings:

FIG. 9 is an exemplary messaging diagram associated with the exemplary operations of FIG. 8.

DETAILED DESCRIPTION

The following detailed description of the invention refers to the accompanying drawings. The same reference numbers in different drawings may identify the same or similar elements. Also, the following detailed description does not limit the invention.

Figure 1:
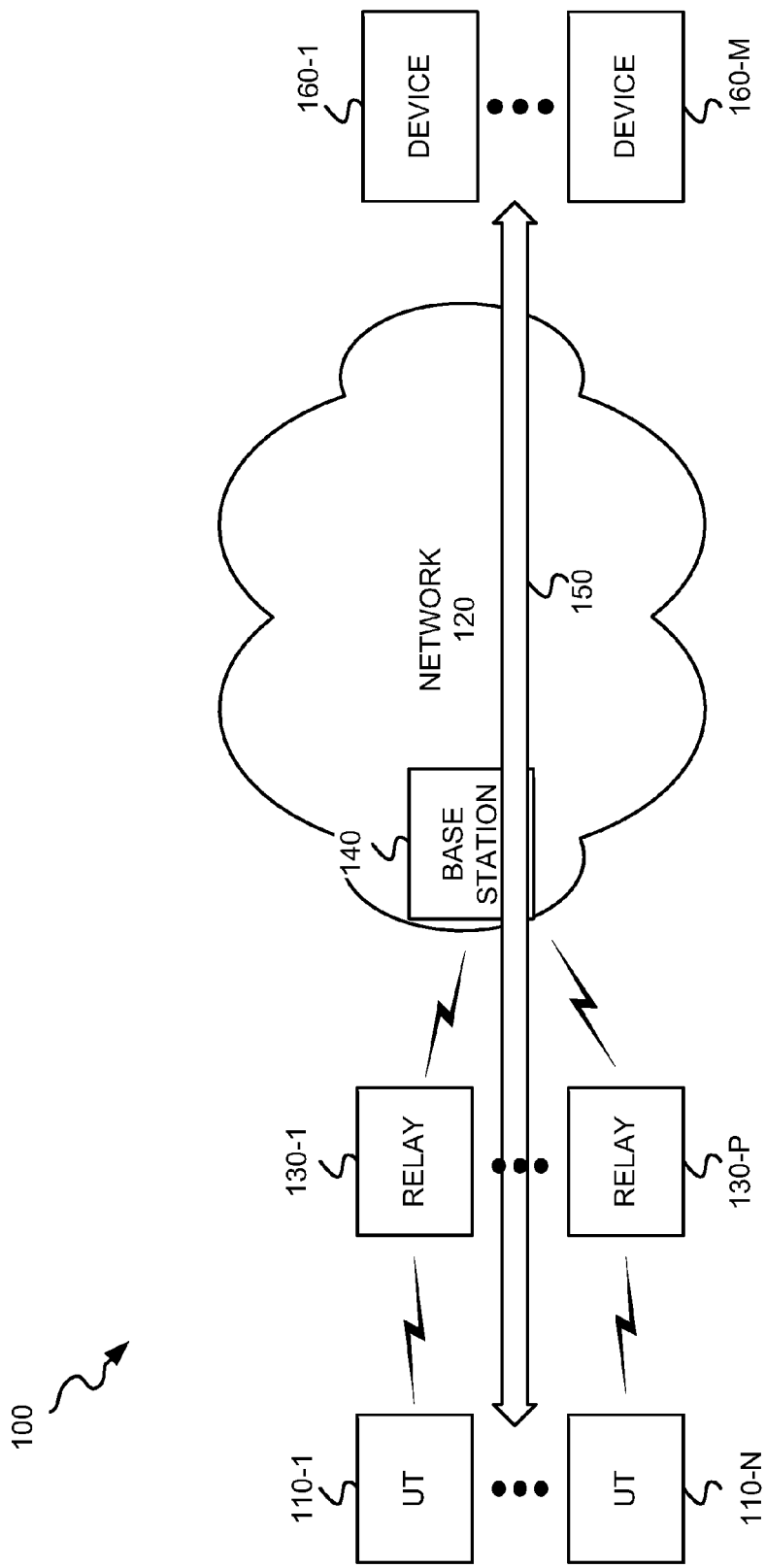
FIG. 1 illustrates an exemplary communications system in which embodiments described herein may be implemented.

FIG. 1 illustrates an exemplary communications system 100 that may include multiple user terminals (UT) 110-1 through 110-N connected to a network 120 via multiple relay nodes 130-1 through 130-P and a base station 140. UTs 110-1 through 110-N may communicate 150 with devices 160-1 through 160-M via relays 130-1 through 130-P and base station 140 (and other components of network 120 not shown in FIG. 1). Thus, relay nodes 130-1 through 130-P and base station 140 may function as intermediate components of communications system 100 that may be used to facilitate end-to-end communication between UTs 110-1 through 110-N and devices 160-1 through 160-M.

UTs 110-1 through 110-N may include cellular radiotelephones, personal digital assistants (PDAs), Personal Communications System (PCS) terminals, laptop computers, palmtop computers, or any other types of devices or appliances that include a communication transceiver that permits the device to communicate with other devices via a wireless link. A PCS terminal may combine a cellular radiotelephone with data processing, facsimile and data communications capabilities. A PDA may include a radiotelephone, a pager, an Internet/intranet access device, a web browser, an organizer, calendars and/or a global positioning system (GPS) receiver. UTs 110-1 through 110-N may be referred to as "pervasive computing" devices.

Relay nodes 130-1 through 130-P may include wireless nodes that receive data transmissions from multiple ones of UTs 110-1 through 110-N and network code (described further below) and relay the received data transmissions to base station 140. The network coding performed by relay nodes 130-1 through 130-P may include analog or digital network coding. The digital network coding typically involves linearly combining data from a group of user terminals, such as, for example, XOR bitwise encoding, Reed Solomon encoding, modulus encoding, or other types of operations for combining data bits from different user terminals of a group of user terminals.

Devices 160-1 and 160-M may include similar devices to UTs 110-1 through 110-N and, in some implementations, may additionally include telephones (e.g., Plain Old Telephone system (POTs) telephones) that are connected to a Public Switched Telephone Network (PSTN).

Network(s) 120 may include one or more networks of any type, including a local area network (LAN); a wide area network (WAN); a metropolitan area network (MAN); a telephone network, such as a PSTN or a PLMN; a satellite network; an intranet, the Internet; or a combination of networks. The PLMN(s) may further include a packet-switched sub-network, such as, for example, General Packet Radio Service (GPRS), Cellular Digital Packet Data (CDPD), or Mobile IP network.

Figure 2:
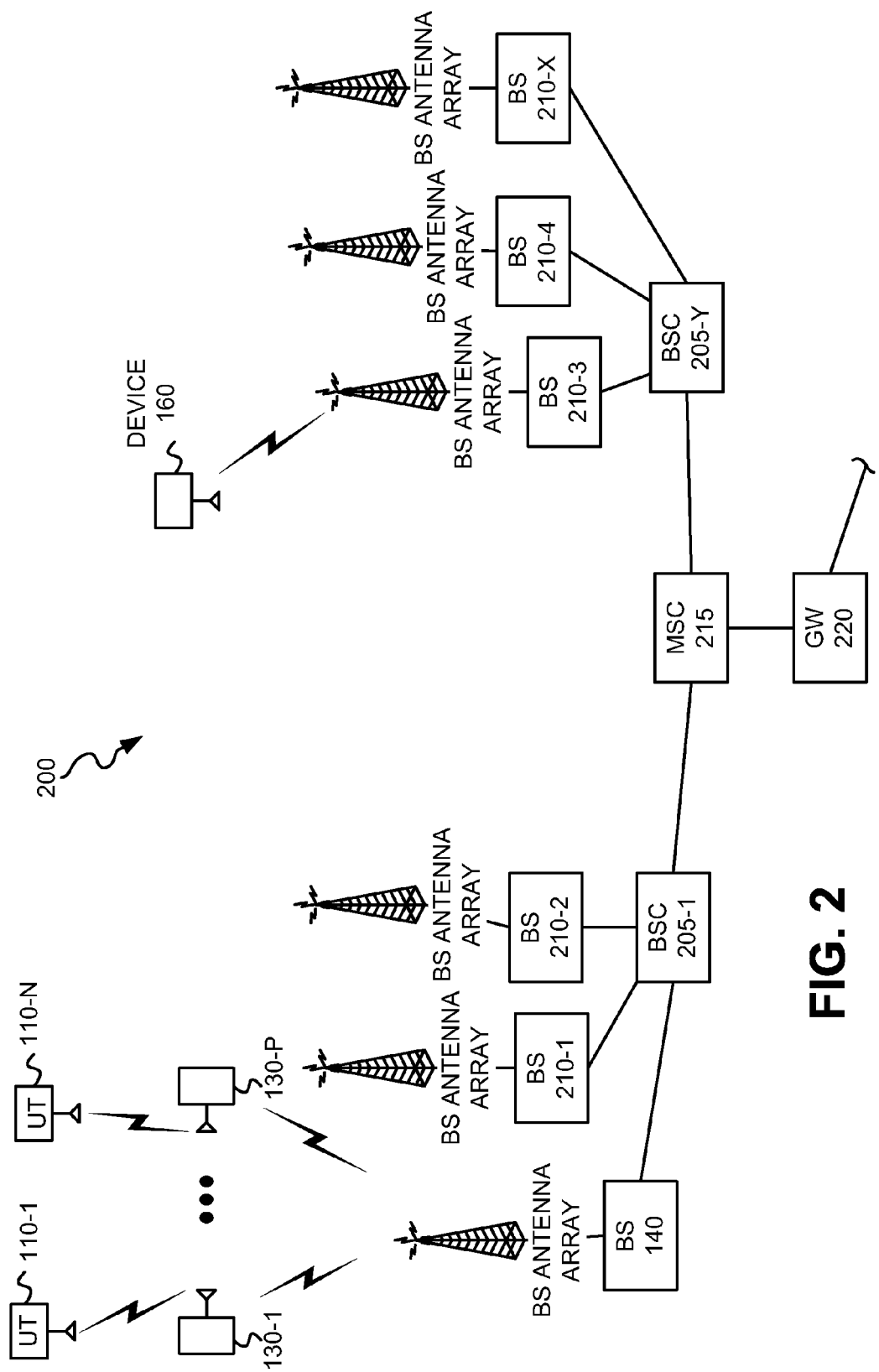
FIG. 2 illustrates an exemplary implementation in which a network of the system of FIG. 1 includes a Public Land Mobile Network (PLMN)

FIG. 2 illustrates an example of system 100 of FIG. 1, where network 120 includes a PLMN 200. As shown in FIG. 2, UTs 110-1 and 110-N and device 160 may include cellular radiotelephones.

PLMN 200 may include one or more base station controllers (BSCs) 205-1 through 205-Y (alternatively called "radio network controllers" (RNCs) in some implementations), multiple base stations (BSs) 140 and 210-1 through 210-X along with their associated antenna arrays, one or more mobile switching centers (MSCs), such as MSC 215, and one or more gateways (GWs), such as GW 220. PLMN 200 may additionally include components (not shown) for connecting PLMN 200 to a packet-switched network, such as a Packet Data Network (PDN), such that UTs 110-1 through 110-N and device 160 can send or receive packet-switched data from the PDN. The components for connecting PLMN 200 to the PDN may include a Serving GPRS Support Node (SGSN) and a Gateway GPRS Support Node (GGSN) (not shown).

Base stations 140 and 210-1 through 210-X may format the data transmitted to, or received from, the antenna arrays in accordance with existing techniques and may communicate with BSCs 205-1 through 205-Y or with a device, such as device 160. Among other functions, BSCs 205-1 through 205-Y may route received data to either MSC 215 or a base station (e.g., BSs 140 or 210-1 through 210-X). MSC 215 may route received data to BSC 205-1, 205-Y, or GW 220. GW 220 may route data received from an external domain (not shown) to an appropriate MSC (such as MSC 215), or from an MSC to an appropriate external domain. In one implementation, the external domain may include a different PLMN or a PSTN.

Figure 3A:
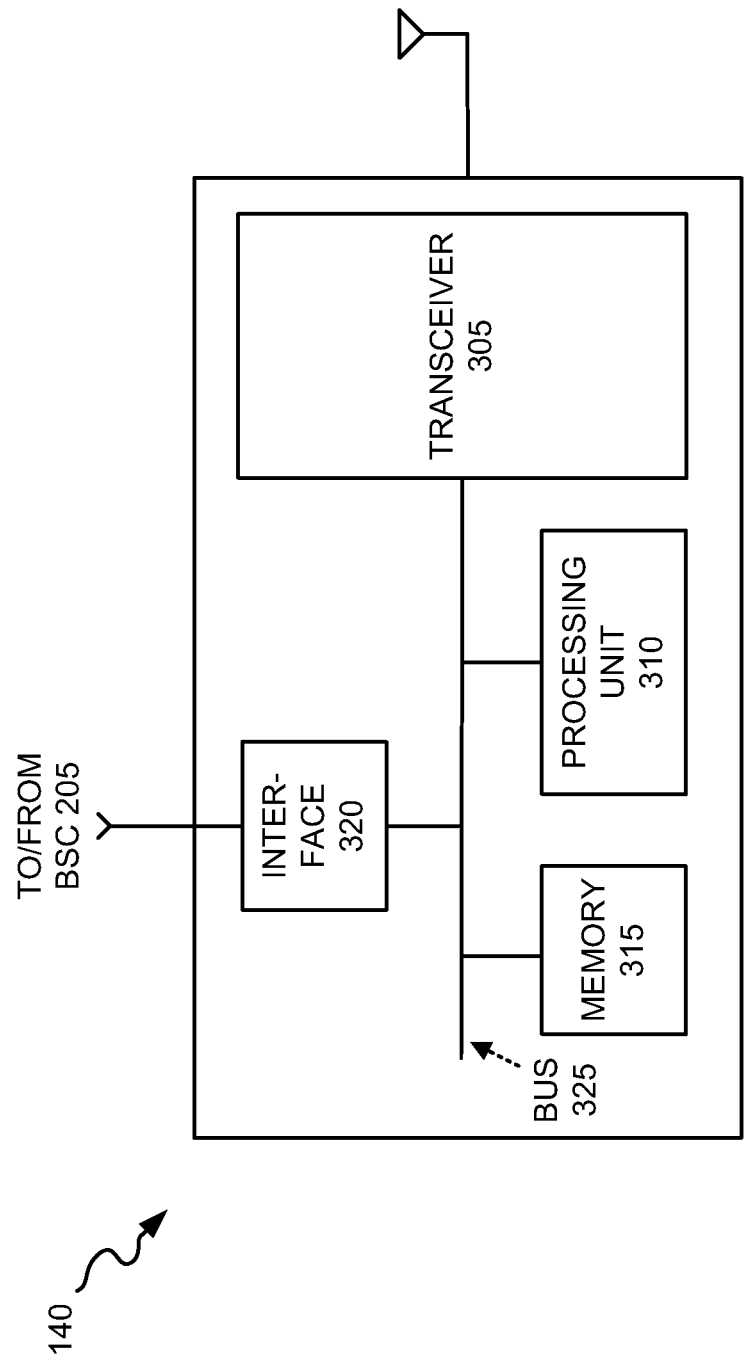
FIG. 3A illustrates exemplary components of the base station of FIG. 1.

FIG. 3A illustrates an exemplary implementation of BS 140. Base stations 210-1 through 210-X may be similarly configured. BS 140 may include a transceiver 305, a processing unit 310, a memory 315, an interface 320 and a bus 325.

Transceiver 305 may include transceiver circuitry for transmitting and/or receiving symbol sequences using radio frequency signals via one or more antennas. Processing unit 310 may include a processor, a microprocessor, or processing logic that may interpret and execute instructions. Processing unit 310 may perform all device data processing functions. Memory 315 may provide permanent, semi-permanent, or temporary working storage of data and/or instructions for use by processing unit 310 in performing device processing functions. Memory 315 may include read only memory (ROM), random access memory (RAM), large-capacity storage devices, such as a magnetic and/or optical recording medium and its corresponding drive, and/or other types of memory devices. Interface 320 may include circuitry for interfacing with a link that connects to a BSC (e.g., BSC 205-1 or BSC 205-Y). Bus 325 may interconnect the various components of BS 140 to permit the components to communicate with one another.

The configuration of components of BS 140 illustrated in FIG. 3A is for illustrative purposes only. Other configurations with more, fewer, or a different arrangement of components may be implemented.

Figure 3B:
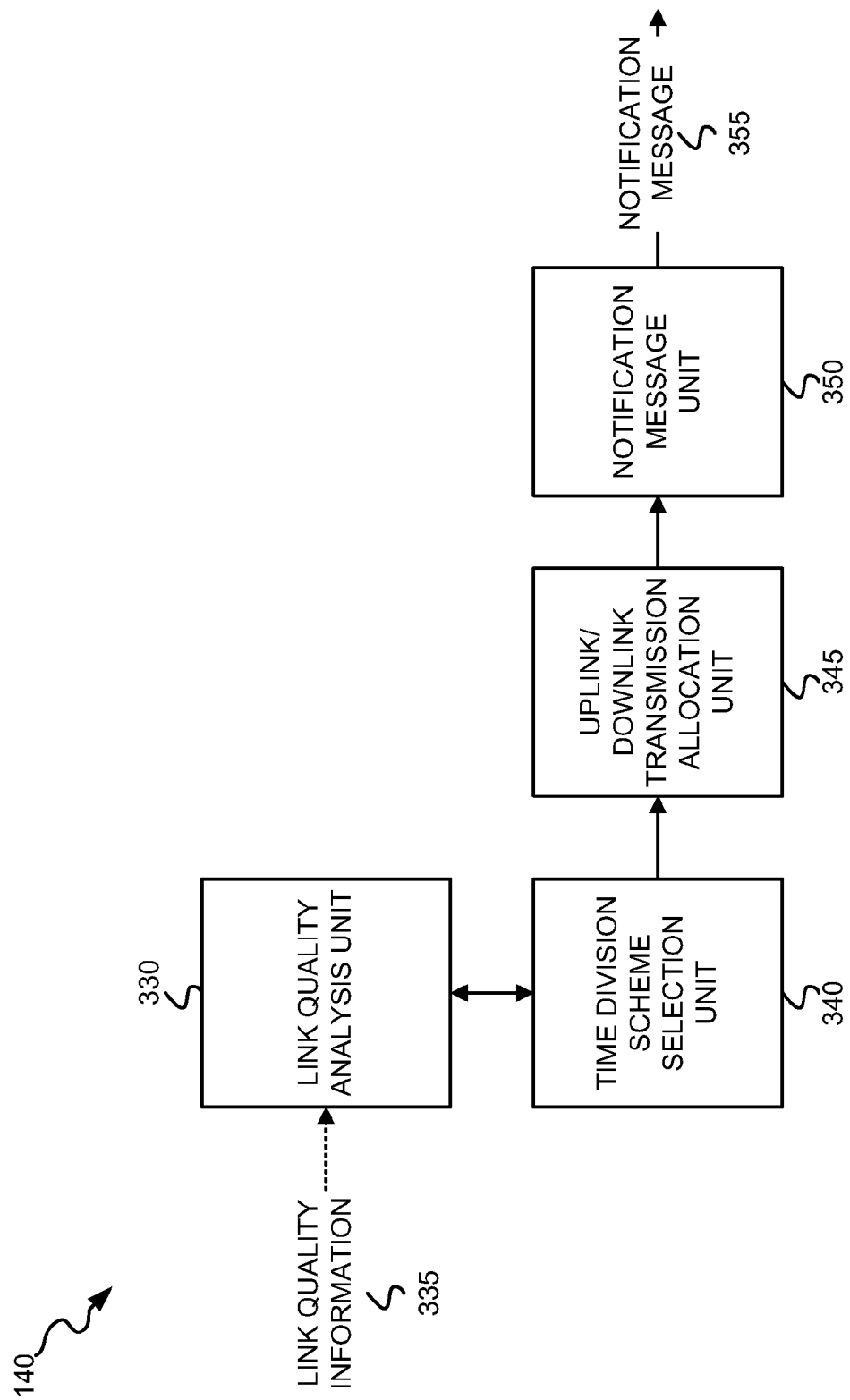
FIG. 3B illustrates exemplary functional components of the base station of FIG. 1.

FIG. 3B illustrates a functional diagram of base station 140 according to an exemplary implementation. The various functional components shown in FIG. 3B may be implemented by processing unit 310, memory 315, transceiver 305, and possibly other components of base station 140. Base station 140 may include a link quality analysis unit 330, a time division scheme selection unit 340, an uplink/downlink transmission allocation unit 345, and a notification message unit 350.

Link quality analysis unit 330 may analyze link quality information that may be received from UTs 110-1 through 110-N, received from a relay node 130, and/or may be measured at base station 140. The link quality information may include, for example, link quality information associated with the direct radio channel links between UTs 110-1 through 110-N and base station 140, link quality information associated with the links between UTs 110-1 through 110-N and relay node 130, and link quality information associated with the link between relay node 130 and base station 140.

Time division scheme selection unit 340 may select a time division scheme to use for allocating transmission intervals and interval lengths (i.e., time slots and their respective lengths). For example, in a cellular system, the selected time division scheme may allocate transmission intervals and interval lengths on the uplink and/or downlink. The time division schemes may include, among other time division schemes, a time division scheme to achieve "fairness-per-node," a time division scheme to achieve "fairness-per-user terminal," and a time division scheme to achieve "equal delay" per user terminal. Any of these time division schemes, either by themselves or in combination, may be selected to allocate uplink transmission intervals and interval lengths to each of UTs 110-1 through 110-N and to relay node 130 for the network coding. As further described below, a cost function based algorithm may be used to optimize certain desired performance measures using one or more selected time division schemes. The "fairness-per-node" and "fairness-per-user terminal" time division schemes are described in more detail below.

Uplink/downlink transmission allocation unit 345 may allocate uplink and/or downlink transmission intervals and interval lengths based on the time division scheme selected by time division scheme selection unit 340. Allocation of transmission intervals and interval lengths, for the exemplary "fair-per-node" and "fair-per-user terminal" time division schemes are described in further detail below with respect to FIGS. 6 and 7.

Notification message unit 350 may construct one or more notification messages that may inform the selected relay node 130 and the user terminals 110-1 through 110-N of the allocated transmission intervals and interval lengths. A single notification message may be constructed and sent to relay node 130 for relaying on to UTs 110-1 through 110-N, or multiple notification messages may be constructed that can be sent to relay node 130 and directly to each of UTs 110-1 through 110-N.

Figure 4A:
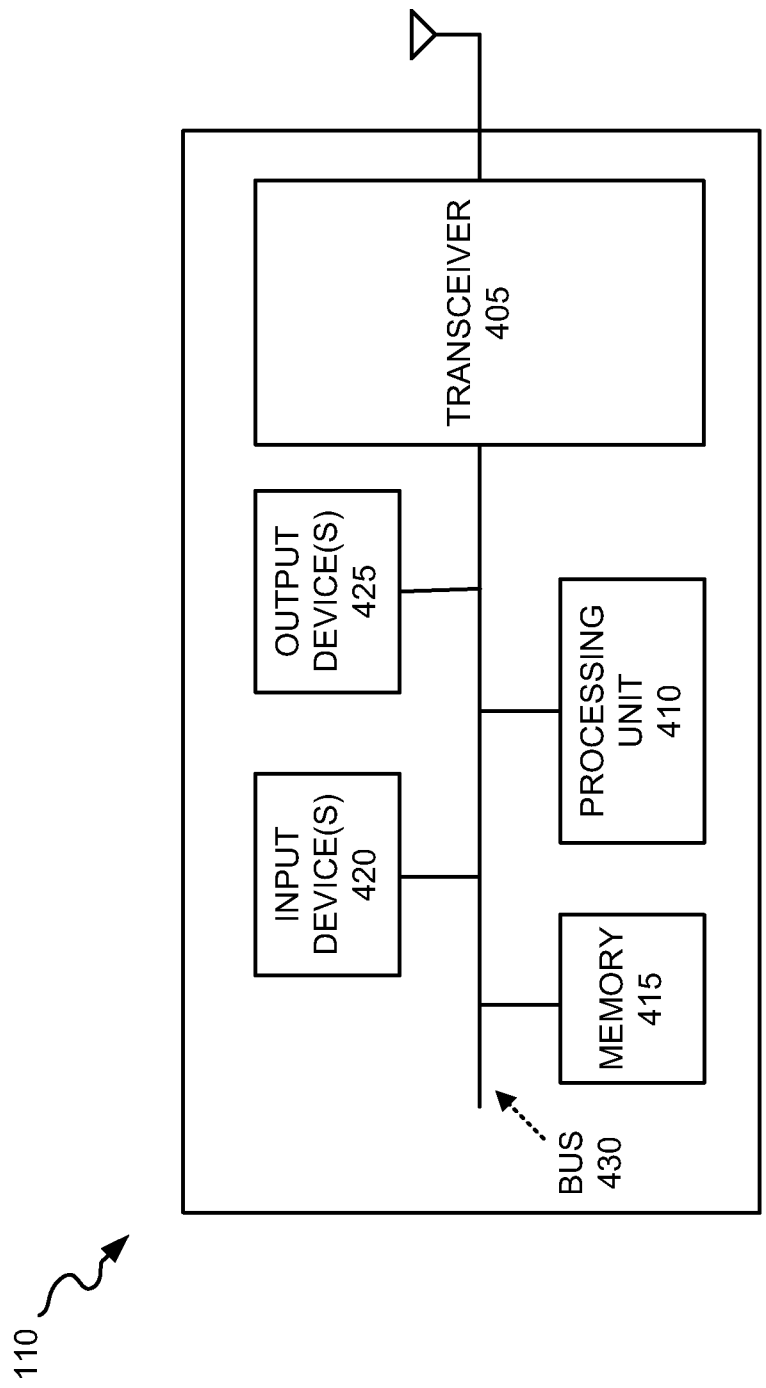
FIG. 4A illustrates exemplary components of a user terminal of FIG. 1.

FIG. 4A illustrates exemplary components of a UT 110. Relays 130-1 through 130-P may be similarly configured. UT 110 may include a transceiver 405, a processing unit 410, a memory 415, an input device(s) 420, an output device(s) 425, and a bus 430.

Transceiver 405 may include transceiver circuitry for transmitting and/or receiving symbol sequences using radio frequency signals via one or more antennas. Transceiver 405 may include, for example, a RAKE or a GRAKE receiver. Processing unit 410 may include a processor, microprocessor, or processing logic that may interpret and execute instructions. Processing unit 410 may perform all data processing functions for inputting, outputting, and processing of data including data buffering and device control functions, such as call processing control, user interface control, or the like.

Memory 415 may provide permanent, semi-permanent, or temporary working storage of data and instructions for use by processing unit 410 in performing device processing functions. Memory 415 may include ROM, RAM, large-capacity storage devices, such as a magnetic and/or optical recording medium and its corresponding drive, and/or other types of memory devices. Input device(s) 420 may include mechanisms for entry of data into UT 110. For example, input device(s) 420 may include a key pad (not shown), a microphone (not shown) or a display unit (not shown). The key pad may permit manual user entry of data into UT 110. The microphone may include mechanisms for converting auditory input into electrical signals. The display unit may include a screen display that may provide a user interface (e.g., a graphical user interface) that can be used by a user for selecting device functions. The screen display of the display unit may include any type of visual display, such as, for example, a liquid crystal display (LCD), a plasma screen display, a light-emitting diode (LED) display, a cathode ray tube (CRT) display, an organic light-emitting diode (OLED) display, etc.

Output device(s) 425 may include mechanisms for outputting data in audio, video and/or hard copy format. For example, output device(s) 425 may include a speaker (not shown) that includes mechanisms for converting electrical signals into auditory output. Output device(s) 425 may further include a display unit that displays output data to the user. For example, the display unit may provide a graphical user interface that displays output data to the user. Bus 430 may interconnect the various components of UT 110 to permit the components to communicate with one another.

The configuration of components of UT 110 illustrated in FIG. 4A is for illustrative purposes only. Other configurations with more, fewer, or a different arrangement of components may be implemented.

Figure 4B:
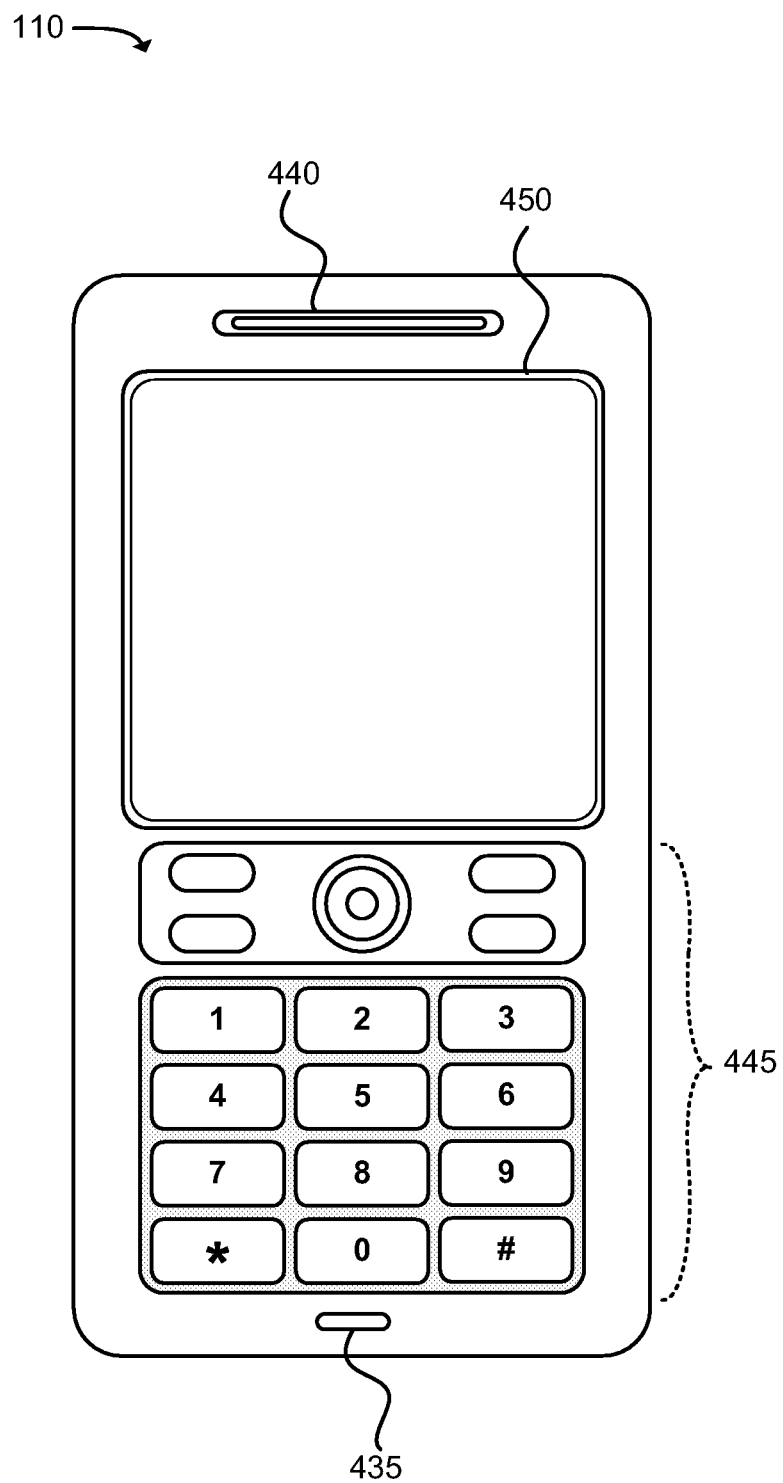
FIG. 4B illustrates an exemplary implementation of the user terminal of FIG. 4A where the user terminal is a cellular radiotelephone.

FIG. 4B illustrates an exemplary implementation of UT 110 in which UT 110 includes a cellular radiotelephone. As shown in FIG. 4B, the cellular radiotelephone may include a microphone 435 (e.g., of input device(s) 420) for entering audio information into UT 110, a speaker 440 (e.g., of output device(s) 425) for providing an audio output from UT 110, a keypad 445 (e.g., of input device(s) 420) for manual entry of data or selection of device functions, and a display 450 (e.g., of input device(s) 420 or output device(s) 425) that may visually display data to the user and/or which may provide a user interface that the user may use to enter data or to select device functions (in conjunction with keypad 445).

Figure 5:
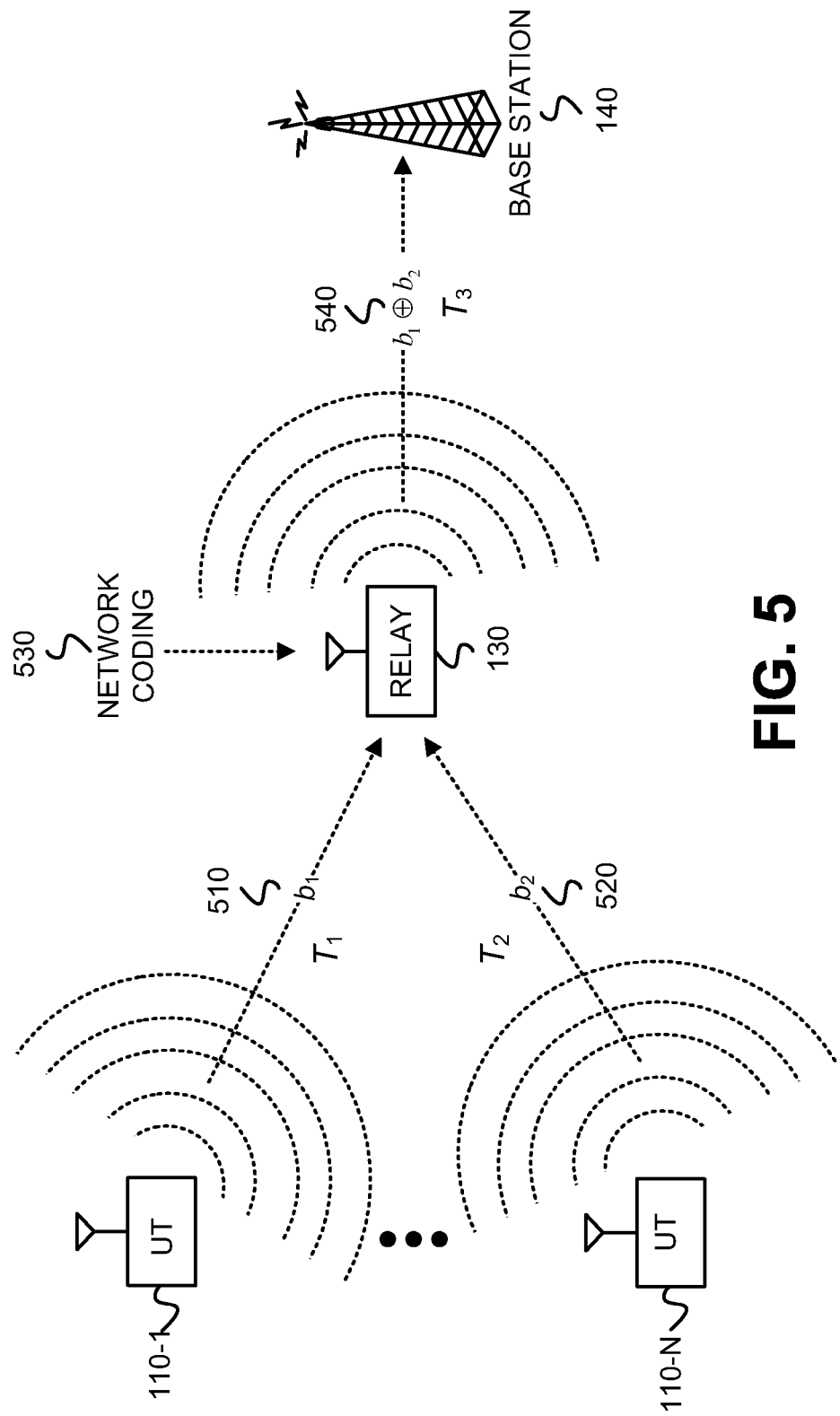
FIG. 5 depicts details of the network coding and relaying of data transmissions from a group of user terminals by a selected relay node to a base station at specified transmission time intervals.

FIG. 5 illustrates the performance of network coding of data from a group of user terminals at a relay node and relaying of the network coded data to a base station. As shown in FIG. 5, user terminal 110-1 may transmit 510 data $b_1$ during transmission time interval $T_1$ to relay node 130. Relay node 130 may be selected from relay nodes 130-1 through 130-P of FIG. 1 based on a selection scheme not described herein. User terminal 110-N may also transmit 520 data $b_2$ during transmission time interval $T_2$ to relay node 130. Subsequent to receipt of data $b_1$ and $b_2$, relay node 130 may perform network coding 530 on the data, and then may relay/transmit 540 the network coded data to base station 140 during transmission time interval $T_3$. In the exemplary implementation depicted in FIG. 5, relay node 130-1 is depicted as using Exclusive OR operations (XOR-$\oplus$) to network code the data $b_1$ and $b_2$ received from UTs 110-1 and 110-N. In other implementations, different network coding schemes may be used.

As described herein, the relative time division of transmission phases (i.e., transmission time intervals or time slots) in a wireless network coding system may be achieved according to various time division schemes. For example, assuming that there are two user terminals being network coded, the various time division schemes may allocate different transmission intervals and interval lengths (e.g., uplink and/or downlink) for each of the time intervals $T_1$, $T_2$ and $T_3$ shown in FIG. 5. For example, one time division scheme may achieve "fairness-per-node." Another time division scheme may attempt to achieve "fairness-per-user terminal." A further time division scheme may attempt to achieve equal delay per user terminal. Any of these time division schemes or other time division schemes, either by themselves or in combination, may be selected to allocate uplink transmission intervals and interval lengths to each of UTs 110-1 through 110-N and to relay node 130. The other time division schemes may include schemes based on channel quality measures of different links in the system. For example, the other time division schemes may be based on channel quality measures associated with the links between the user terminals and the relay node, between the relay node and the base station and/or between the user terminals and the base station.

As further described below, a cost function based algorithm may be used to optimize certain desired performance measures using one or more selected time division schemes.

Signal-to-Noise and Interference Ratios (SINR) equations associated with the network coding transmissions shown in FIG. 5 may be derived and used to demonstrate how different time division schemes lead to different capacity equations that may be used to optimize certain desired performance measures. Assume that during $T_1$, a first user terminal (e.g., user terminal 110-1) transmits, and its signal is received at base station 140 and relay 130. The signal received after Orthogonal Frequency Division Multiplexing (OFDM) demodulation at base station 140 for the $k^{th}$ sub-carrier of user terminal 1 may be expressed as:

$$y_1^{(1)}(k) = H_{1,1}(k)s_{1,1}(k) + \sum_{i=2}^{N_b} H_{i,1}(k)s_{i,1}(k) + w_1(k) \quad \text{Eqn. (1)}$$

where:

$H_{i,j}(k)$ is the radio channel between the transmitter of the $j^{th}$ user terminal of BS i and the receiver of BS 1, $s_{i,j}(k)$ is the modulated signal of the $j^{th}$ user terminal in BS i, $w_1(k)$ is the thermal noise, and $N_b$ is the number of base stations in the system.

The signal received at relay node 130 after $T_1$ may be expressed as:

$$y_{r,1}^{(1)}(k) = H_{r,1,1}(k)s_{1,1}(k) + \sum_{i=2}^{N_b} H_{r,i,1}(k)s_{i,1}(k) + w_{r,1} \quad \text{Eqn. (2)}$$

where $H_{r,i,j}$ is the radio channel between the transmitter of the $j^{th}$ user terminal of BS i and the receiver of the active relay node of BS 1.

The SINR at base station 140 after $T_1$, $\Gamma_1$ may be expressed as:

$$\Gamma_1 = \frac{|H_{1,1}|^2 p_{1,1}}{\sum_{i=2}^{N_b} |H_{i,1}|^2 p_{i,1} + \sigma_1^2} \quad \text{Eqn. (3)}$$

where $p_{i,j}$ is the transmitted power of the $j^{th}$ user terminal of BS i.

The SINR for user terminal 1 at relay node 130 after $T_1$ is denoted as $\Gamma_{r,1}$ and may be expressed as:

$$\Gamma_{r,1} = \frac{|H_{r,1,1}|^2 p_{1,1}}{\sum_{i=2}^{N_b} |H_{r,i,1}|^2 p_{i,1} + \sigma_{r,1}^2} \quad \text{Eqn. (4)}$$

Similarly, the signal received at base station 140 after user terminal 2 (e.g., UT 110-N) has transmitted during $T_2$ may be expressed as:

$$y_1^{(2)}(k) = H_{1,2}(k)s_{1,2}(k) + \sum_{i=2}^{N_b} H_{i,2}(k)s_{i,2}(k) + w_1 \quad \text{Eqn. (5)}$$

The signal received at relay node 130 after $T_2$ may be expressed as:

$$y_{r,1}^{(2)}(k) = H_{r,1,1}(k)s_{1,2}(k) + \sum_{i=2}^{N_b} H_{r,i,2}(k)s_{i,2}(k) + w_{r,2} \quad \text{Eqn. (6)}$$

The SINR at base station 140 after $T_2$, $\Gamma_2$, may be expressed as $$\Gamma_2 = \frac{|H_{1,2}|^2 p_{1,2}}{\sum_{i=2}^{N_b} |H_{i,2}|^2 p_{i,2} + \sigma_2^2} \quad \text{Eqn. (7)}$$

The SINR for user terminal 2 (e.g., UT 110-N) at relay node 130 after $T_2$ is denoted as $\Gamma_{r,2}$ and may be expressed as:

$$\Gamma_{r,2} = \frac{|H_{r,1,2}|^2 p_{1,2}}{\sum_{i=2}^{N_b} |H_{r,i,2}|^2 p_{i,2} + \sigma_{r,2}^2} \quad \text{Eqn. (8)}$$

During the third hop, relay node 130 may transmit the network-coded signal. The signal received at base station 140 after $T_3$ may be expressed as $$y_1^{(3)}(k) = G_{r,1}d_1 + \sum_{i=2}^{N_b} G_{r,i}d_i + w_3 \quad \text{Eqn. (9)}$$

where $G_{r,i}$ is the channel between the transmitter of the active relay of BS i and the receiver of BS 1, and $d_i$ denotes the network-coded transmitted signal from the active relay of BS i.

The resulting SINR, $\Gamma_3$ is then given by:

$$\Gamma_3 = \frac{|G_{r,1}|^2 p_{r,1}}{\sum_{i=2}^{N_b} |G_{r,i}|^2 p_{r,i} + \sigma_3^2} \quad \text{Eqn. (10)}$$

where $p_{r,i}$ is the transmitted power of the active relay in BS i.

The transmitted network coded data may then be decoded based on the following algorithm. Without loss of generality, let us assume that user terminal 1 (UT 110-1) has a better link to base station 140 than user terminal 2 (UT 110-N), i.e., $\Gamma_1 > \Gamma_2$. Then the data of user terminal 1 may be decoded based on its SINR through the direct link to base station 140. However, this data still needs to be transmitted at a rate so that it can be decoded at relay node 130 so that it can further be used to decode the network coded data (e.g., XOR-ed data) transmitted by relay node 130. The resulting equivalent SINR of user terminal 1 may then be given by:

$$\Gamma'_1 = \min\{\Gamma_1; \Gamma_{r,1}\} \quad \text{Eqn. (11)}$$

Consequently, the relayed signal may then be used (after being decoded against the transmission of user terminal 1) in order to improve the equivalent SINR of the weak user terminal in the pair. Assuming maximum ratio combining (MRC), the equivalent SINR of user terminal 2 may then be given by:

$$\Gamma'_2 = \min\{\Gamma_2 + \Gamma_3; \Gamma_{r,2}\} \quad \text{Eqn. (12)}$$

The resulting sum capacity equation may be based on the amount of time each node is given to transmit its data.

Figure 6:
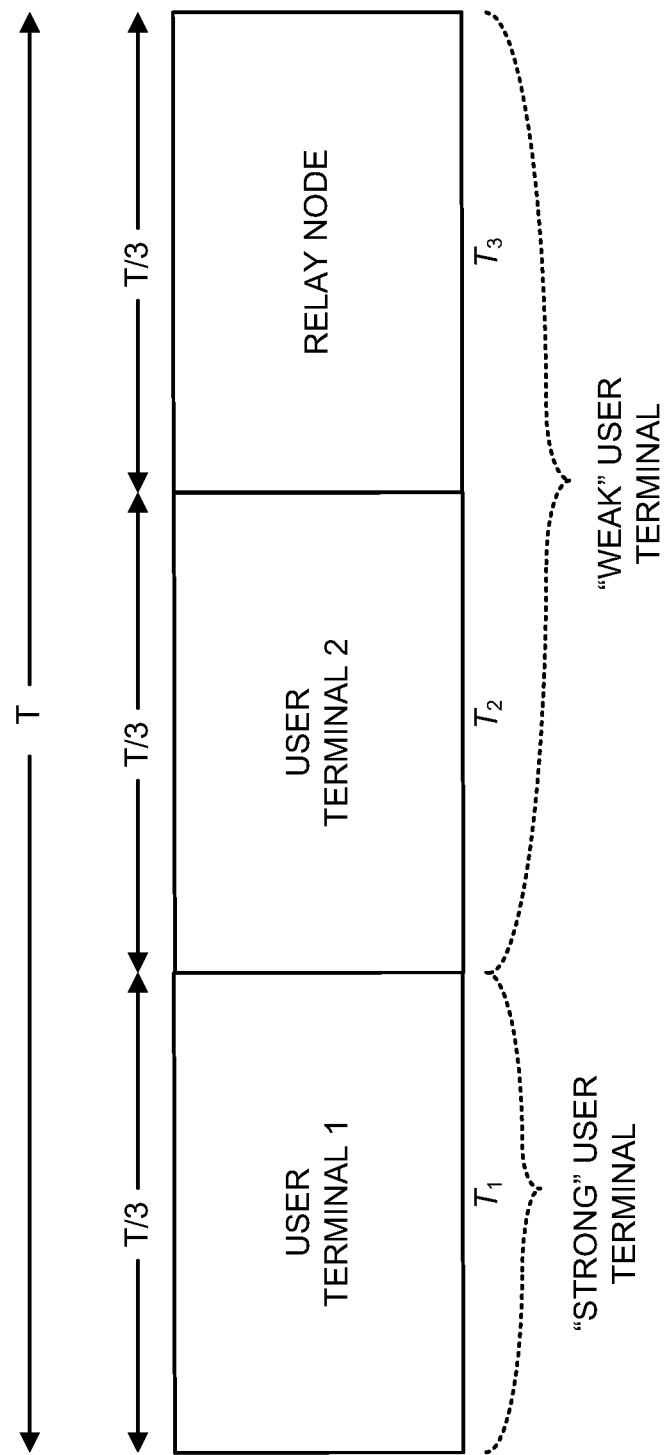
FIG. 6 illustrates a "fair-per-node" time division scheme according to an exemplary embodiment.

For a "fair-per-node" time division scheme (alternatively referred to as time division "scheme 1" herein), shown in FIG. 6, the total transmission time T may be divided into three equal time slots given by:

$$T_1 = T_2 = T_3 = \frac{T}{3} \quad \text{Eqn. (13)}$$

One time slot may be assigned to each node, e.g., $T_1$ may be assigned to user terminal 1 (e.g., UT 110-1), $T_2$ may be assigned to user terminal 2 (e.g., UT 110-N) and $T_3$ may be assigned to relay node 130. With such time slot assignments, the "strong" user terminal (e.g., the user terminal having the strongest direct radio channel connection to base station 140) will have access to one third of the total transmission time T, whereas the "weak" user terminal (e.g., the user terminal having the weakest direct radio channel connection to base station 140) will have access to the remaining two thirds of the total transmission time T (i.e., one third through its own transmission time, and another third through the relay node transmission time).

Based on the SINR expressions derived above, the sum capacity of the "fair-per-node" time division scheme of FIG. 6 may be expressed as:

$$C_1 = \frac{1}{3}[\log_2(1 + \Gamma'_1) + \log_2(1 + \Gamma'_2)] \quad \text{Eqn. (14)}$$

Figure 7:
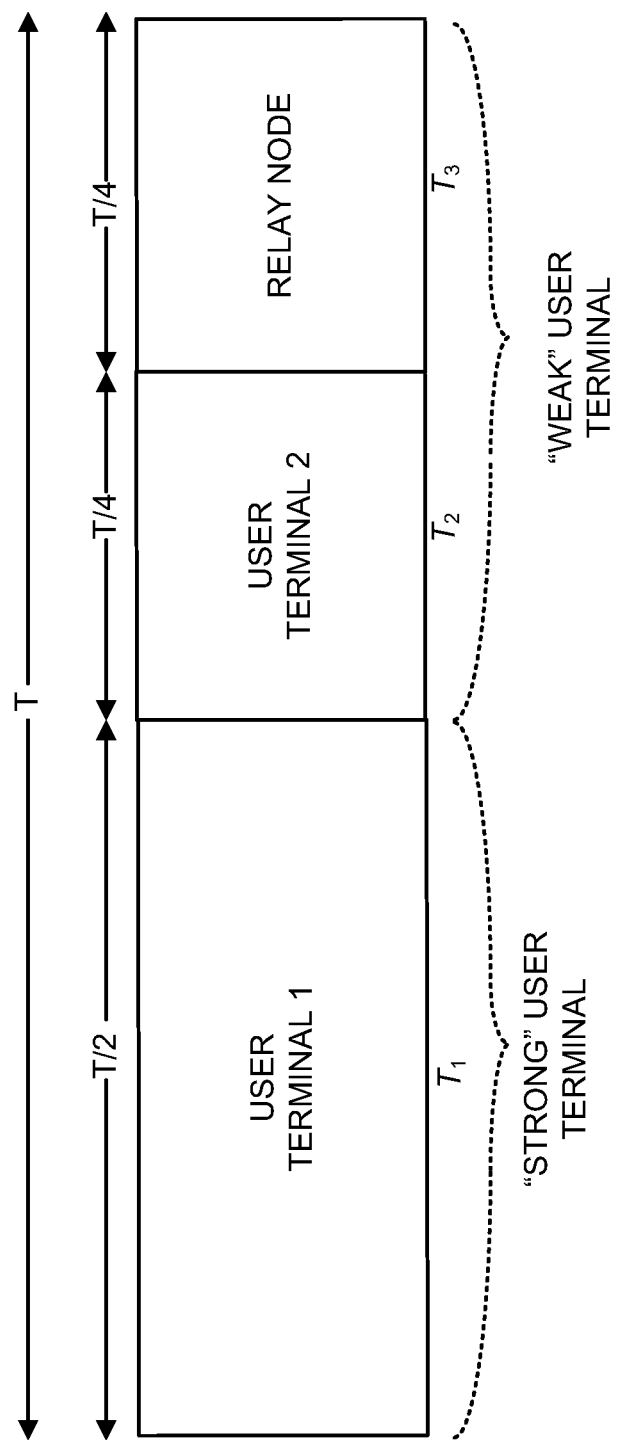
FIG. 7 illustrates a "fair-per-user terminal" time division scheme according to an exemplary embodiment.

For a "fair-per-user terminal" time division scheme (alternatively referred to as time division "scheme 2" herein), shown in FIG. 7, the total transmission time T may be divided into three time slots given by:

$$T_1 = 2T_2 = 2T_3 = \frac{T}{2} \quad \text{Eqn. (15)}$$

Time slot $T_1$ may be assigned to the "strong" user terminal, time slot $T_2$ may be assigned to the "weak" user terminal, and time slot $T_3$ may be assigned to relay node 130. With the relative time division shown in FIG. 7, the "strong" user terminal and the "weak" user terminal will each have access to half of the transmission duration T. The sum capacity of the time division scheme of FIG. 7 may be expressed as:

$$C_2 = \frac{1}{2}\left[\log_2(1 + \Gamma'_1) + \frac{1}{2}\log_2(1 + \Gamma'_2)\right] \quad \text{Eqn. (16)}$$

Due to the $\log_2$ operator in the capacity equation, it would be expected that time division scheme 2 may provide a comparable performance to time division scheme 1 at low SINR regions, whereas time division scheme 2 may provide substantially higher gains at high SINR regions, thus, providing a higher total system throughput.

Time division schemes 1 and 2, described above, may be combined in some implementations to form a cost-based algorithm. One example of such a combination is choosing the time division scheme (e.g., scheme 1 or scheme 2) that maximizes the sum-capacity at a given time period. For example, a time division scheme t* may be selected that maximizes the sum capacity according to the following expression:

$$t^* = \underset{t \in \{Scheme1, Scheme2\}}{\operatorname{argmax}} C(U_1, U_2) \qquad \text{Eqn. (17)}$$

As another example, a time division scheme t* may be selected that minimizes generated interference according to the expression:

$$t^* = \underset{t \in \{Scheme1, Scheme2\}}{\operatorname{argmin}} I(U_1, U_2) \qquad \text{Eqn. (18)}$$

where the interference may be measured at base stations other than base station 140, at other relay nodes, and/or at other user terminals.

Thus, the interference may be associated with links between the user terminals and the relay node, between the relay node and the base station, between the user terminals and base station, etc. Exemplary cost-based algorithms, such as those represented by Eqns. (17) and (18), may permit "fairness" to be controlled through the selected time division scheme and a parameter (e.g., a given performance measure) associated with network coding of data transmitted between the plurality of user terminals and the base station via the relay node to be optimized.

Figure 8:
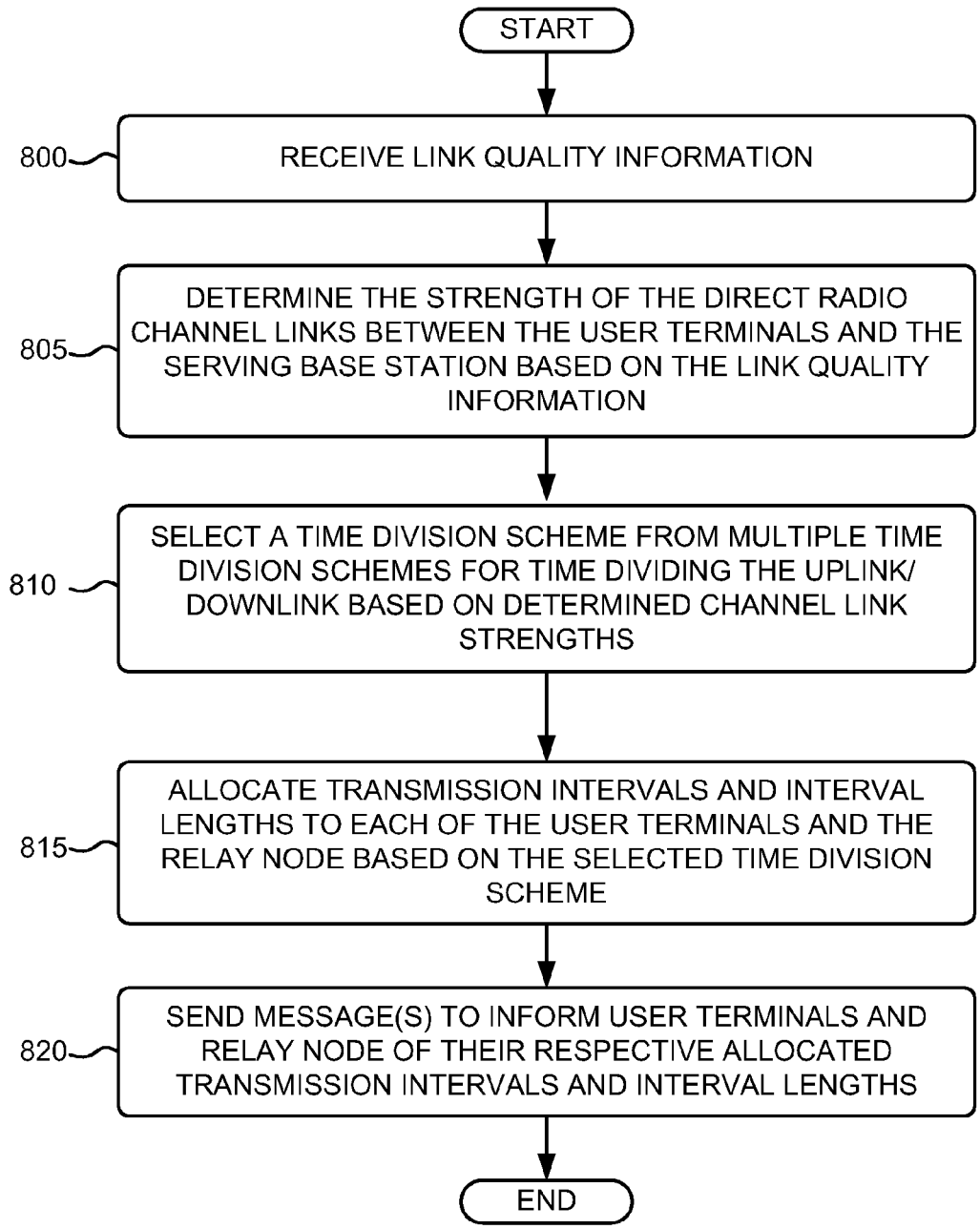
FIG. 8 is a flowchart that illustrates exemplary operations associated with selecting a time division scheme for time dividing a transmission resource and allocating transmission intervals and interval lengths to user terminals and a relay node involved in network coding based on the selected time division scheme.

FIG. 8 is a flowchart that illustrates exemplary operations associated with selecting a time division scheme for time dividing a transmission resource (e.g., uplink and/or downlink in a cellular system) and allocating transmission intervals and interval lengths to user terminals and a relay node involved in network coding based on the selected time division scheme. The exemplary operations of FIG. 8 may be implemented by base station 140. The exemplary operations of FIG. 8 are described below with reference to the messaging diagram of FIG. 9.

The exemplary operations may begin with the receipt of link quality information (block 800). The link quality information may include, for example, Signal-to-Interference-Noise-Ratio (SINR) and/or estimates of channel conditions measured at one or more of UTs 110-1 through 110-N, relay node 130-1, or base station 140. For example, each of UTs 110-1 through 110-N may measure a link quality associated with its link to the selected relay node (e.g., relay node 130-1 in FIG. 9) and may send the link quality information to the selected relay node (as shown in FIG. 9), or directly to base station 140. The received link quality data may permit base station 140 to identify which of UTs 110-1 through 110-N that has the weakest direct radio channel connection to base station 140, and identify which of UTs 110-1 through 110-N that has the strongest direct radio channel connection to base station 140. FIG. 9 depicts relay node 130-1 obtaining 910 link quality data associated with links to UTs 110-1 and 110-N. As further shown in FIG. 9, relay node 130-1 may subsequently send link quality data 915 to base station 140.

The strength of the direct radio channel links between the user terminals and the serving base station may be determined based on the received link quality information (block 805). Base station 140 may evaluate the link quality information received in block 800, which may include link quality information associated with direct links between UTs 110-1 through 110-N, and may determine the relative strengths of the direct radio channel inks between UTs 110-1 through 110-N and base station 140. The user terminal with the direct radio channel link having the weakest strength may be referred to herein as the "weak" user terminal. The user terminal with the direct radio channel link having the strongest strength may be referred to herein as the "strong" user terminal. FIG. 9 depicts base station 140 determining 920 connection strengths of direct links between the UTs and base station 140.

A time division scheme may be selected from multiple time division schemes for time dividing the uplink and/or downlink based on the determined channel link strengths (block 810). The multiple time division schemes may include, but are not limited to, the "fair-per-node" scheme (scheme 1) and/or "fair-per-user terminal" scheme (scheme 2), described above. The multiple time division schemes may include, but are not limited to, the "fair-per-node" scheme (scheme 1) and/or "fair-per-user terminal" scheme (scheme 2), described above. The plurality of time division schemes may further include a time division scheme that attempts to equalize delay per user terminal. The multiple time division schemes may include other time division schemes that are, for example, based on channel quality measures of different links in the system. For example, the other time division schemes may be based on channel quality measures associated with the links between the user terminals and the relay node, between the relay node and the base station and/or between the user terminals and the base station.

Selection of a time division scheme may, in some implementations, include choosing a time division scheme that optimizes a performance measure (e.g., a parameter associated with the network coding process). For example, as expressed in Equations (17) and (18) above, a time division scheme (e.g., scheme 1 or scheme 2) may be selected that maximizes a sum capacity and/or minimizes a generated interference. The determined channel link strengths (block 805) may be used in block 810 to identify user terminals 110-1 through 110-N as a "weak" user terminal or a "strong" user terminal for purposes of allocating transmission intervals and interval lengths, as shown in FIGS. 6 and 7, and as described below with respect to block 815. FIG. 9 depicts base station 140 selecting 925 a time division scheme from multiple time division schemes based on determined link connection strengths.

Transmission intervals and interval lengths may be allocated to each of the user terminals and to the relay node based on the selected time division scheme (block 815). As already described above with respect to FIG. 6, if a "fair-per-node" time division scheme (scheme 1) is selected, the total transmission time T may be divided into three equal time slots $$\left(T_1 = T_2 = T_3 = \frac{T}{3}\right)$$

where one time slot may be assigned to each node, e.g., $T_1$ may be assigned to user terminal 1 (e.g., UT 110-1), $T_2$ may be assigned to user terminal 2 (e.g., UT 110-N) and $T_3$ may be assigned to relay node 130-1. With such time slot assignments, the "strong" user terminal (e.g., the user terminal having the strongest direct radio channel connection to base station 140) will have access to one third of the total transmission time T, whereas the "weak" user terminal (e.g., the user terminal having the weakest direct radio channel connection to base station 140) will have access to the remaining two thirds of the total transmission time T (i.e., one third through its own transmission time, and another third through the relay node transmission time).

As further described above with respect to FIG. 7, if a "fair-per-user terminal" time division scheme (scheme 2) is selected, the total transmission time T may be divided into three $$\left(T_1 = 2T_2 = 2T_3 = \frac{T}{2}\right),$$

time slots where time slot $T_1$ may be assigned to the "strong" user terminal, time slot $T_2$ may be assigned to the "weak" user terminal, and time slot $T_3$ may be assigned to relay node 130-1. With the relative time division shown in FIG. 7, the "strong" user terminal and the "weak" user terminal will each have access to half of the transmission duration T. FIG. 9 depicts base station 140 allocating 930 transmission intervals and interval lengths to the UTs and the selected relay node based on the selected time division scheme.

A message(s) may be sent to inform the user terminals and the relay node of their respective allocated transmission intervals and interval lengths (block 820). The notification message may be sent to relay node 130-1 for relaying to user terminals 110-1 through 110-N, or messages may be sent individually to relay node 130-1, and directly to UTs 110-1 through 110-N that inform the user terminals and relay node of their respective transmission intervals allocated in block 815. FIG. 9 depicts base station 140 sending an exemplary notification message 935 to relay node 130-1. Relay node 130-1 may, subsequently, relay notification message 935 on to UTs 110-1 through 110-N (not shown). Subsequent to the exemplary operations of FIG. 8, relay node 130-1 may network code data transmissions from UTs 110-1 through 110-N, based on the transmission time intervals and interval lengths allocated during the exemplary operations of FIG. 8, as generally described above with respect to FIG. 5.

The foregoing description of implementations provides illustration and description, but is not intended to be exhaustive or to limit the invention to the precise form disclosed. Modifications and variations are possible in light of the above teachings, or may be acquired from practice of the invention. For example, while a series of blocks has been described with regard to FIG. 8, the order of the blocks may be modified in other implementations consistent with the principles of the invention. Further, non-dependent blocks may be performed in parallel.

Aspects of the invention may also be implemented in methods and/or computer program products. Accordingly, the invention may be embodied in hardware and/or in software (including firmware, resident software, microcode, etc.). Furthermore, the invention may take the form of a computer program product on a computer-usable or computer-readable storage medium having computer-usable or computer-readable program code embodied in the medium for use by or in connection with an instruction execution system. The actual software code or specialized control hardware used to implement the embodiments described herein is not limiting of the invention. Thus, the operation and behavior of the embodiments were described without reference to the specific software code—it being understood that one of ordinary skill in the art would be able to design software and control hardware to implement the aspects based on the description herein.

Furthermore, certain portions of the invention may be implemented as "logic" that performs one or more functions. This logic may include hardware, such as an application specific integrated circuit or field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented at a base station in a wireless network comprising first and second user terminals and a relay node configured to relay data transmissions from the first and second user terminals to the base station, the method comprising:
    determining qualities of links between the user terminals and the base station;
    selecting a time division scheme from a plurality of time division schemes based on the determined qualities of the links, the time division schemes including time slots assigned to the first and second user terminals and the relay node, wherein the plurality of time division schemes includes:
        (i) a first time division scheme in which transmission time is divided into three equal slots with:
        a first equal slot assigned to the first user terminal,
        a second equal slot assigned to the second user terminal, and
        a third equal slot assigned to the relay node, and
        (ii) a second time division scheme in which transmission time is divided into three distinct slots with:
        a first distinct slot assigned to the first user terminal,
        a second distinct slot assigned to the relay node, and
        a third distinct slot, equal to a combined time interval of the first and second distinct slots, assigned to the second terminal;
    allocating, based on the selected time division scheme, transmission intervals and interval lengths to each of the first and second user terminals and the relay node;
    notifying the user terminals and the relay node of their respective allocated transmission intervals and interval lengths; and
    receiving from the relay node network-coded data transmitted to the base station based on the allocated transmission intervals and the interval lengths.

2. The method of claim 1, where the qualities of the links include signal to noise and interference ratios associated with the links between the user terminals and the base station.

3. The method of claim 1, further comprising determining link qualities associated with links between the user terminals and the relay node, and wherein selecting the time division scheme is further based on the determined links qualities associated with links between the user terminals and the relay node.

4. The method of claim 3, further comprising determining a link quality associated with a link between the relay node and the base station, and wherein selecting the time division scheme is further based on the determined link quality associated with the link between the relay node and the base station.

5. The method of claim 1, wherein the first distinct slot of the second time division scheme is equal to the second distinct slot of the second time division scheme.

6. The method of claim 1, wherein the plurality of time division schemes further includes a third time division scheme that achieves equal delay per user terminal.

7. The method of claim 1, wherein selecting the time division scheme comprises selecting the time division scheme that maximizes a sum capacity value.

8. The method of claim 1, where selecting the time division comprises selecting the time division scheme that minimizes generated interference associated with at least one of the relay node, the base station, and the user terminals.

9. A base station configured to serve a plurality of user terminals via a relay node in a cell of a wireless network, the base station comprising:
 a link quality analysis unit configured to determine qualities of links between the plurality of user terminals and the base station,
 a time division scheme selection unit configured to select, based on the determined link qualities, a time division scheme from a plurality of time division schemes, the time division schemes including time slots assigned to the first and second user terminals and the relay node, wherein the plurality of time division schemes includes:
  (i) a first time division scheme in which transmission time is divided into three equal slots with:
  a first equal slot assigned to the first user terminal,
  a second equal slot assigned to the second user terminal, and
  a third equal slot assigned to the relay node, and
  (ii) a second time division scheme in which transmission time is divided into three distinct slots with:
  a first distinct slot assigned to the first user terminal,
  a second distinct slot assigned to the relay node, and
  a third distinct slot, equal to a combined length of the first and second distinct slots, assigned to the second terminal;
 a transmission allocation unit configured to allocate, based on the selected time division scheme, the assigned slots to each of the plurality of user terminals and to the relay node, the allocated slots associated with at least one of an uplink and downlink; and
 a notification message unit configured to notify the plurality of user terminals and the relay node of their respective allocated slots.

10. The base station of claim 9, wherein the qualities of the links include signal to noise and interference ratios associated with links between the user terminals and the base station.

11. The base station of claim 9, wherein the first distinct slot of the second time division scheme is equal to the second distinct slot of the second time division scheme.

12. The base station of claim 9, wherein the plurality of time division schemes further includes a third time division scheme that achieves equal delay per user terminal.

13. The base station of claim 9, wherein the time division scheme selection unit is configured to select the time division scheme that maximizes a sum capacity value.

14. The base station of claim 9, wherein the time division scheme selection unit is configured to select the time division scheme that minimizes generated interference associated with at least one of the relay node, the base station, and the user terminals.

15. The base station of claim 9, wherein the link quality analysis unit is further configured to determine link qualities associated with links between the user terminals and the relay node, and wherein the time division scheme selection unit is configured to select the time division scheme further based on the determined link qualities associated with links between the user terminals and the relay node.

16. The base station of claim 15, wherein the link quality analysis unit is further configured to determine a link quality associated with a link between the relay node and the base station, and wherein the time division scheme selection unit is configured to select the time division scheme further based on the determined link quality associated with the link between the relay node and the base station.

* * * * *

UNITED STATES PATENT AND TRADEMARK OFFICE
CERTIFICATE OF CORRECTION

PATENT NO. : 8,665,866 B2
APPLICATION NO. : 13/058388
DATED : March 4, 2014
INVENTOR(S) : Manssour et al.

It is certified that error appears in the above-identified patent and that said Letters Patent is hereby corrected as shown below:

In the Specification:

Column 9, line 2-3, Equation (6), delete " $y_{r,1}^{(2)}(k) = H_{r,1,1}(k)s_{1,2}(k) + \sum_{i=2}^{N_b} H_{r,i,2}(k)s_{i,2}(k) + w_{r,2}$ " and insert therefor -- $y_{r,1}^{(1)}(k) = H_{r,1,1}(k)s_{1,2}(k) + \sum_{i=2}^{N_b} H_{r,i,2}(k)s_{i,2}(k) + w_{r,2}$ --

Column 9, line 37, delete "SINR, Γ₃ is" and insert therefor -- SINR, $\Gamma_3$, is --

In the Claims:

Column 14, line 62, Claim 2, delete "where the" and insert therefor -- wherein the --

Signed and Sealed this
Nineteenth Day of August, 2014

Michelle K. Lee
*Deputy Director of the United States Patent and Trademark Office*